United States Patent
Gunnam et al.

(10) Patent No.: US 10,467,074 B2
(45) Date of Patent: Nov. 5, 2019

(54) CONDITIONAL JOURNAL FOR STORAGE CLASS MEMORY DEVICES

(71) Applicant: Western Digital Technologies, Inc., Irvine, CA (US)

(72) Inventors: Kiran Kumar Gunnam, Milpitas, CA (US); Viacheslav Anatolyevich Dubeyko, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 3 days.

(21) Appl. No.: 15/395,144

(22) Filed: Dec. 30, 2016

(65) Prior Publication Data

US 2018/0189155 A1 Jul. 5, 2018

(51) Int. Cl.
| | |
|---|---|
| *G06F 11/00* | (2006.01) |
| *G06F 11/07* | (2006.01) |
| *G06F 12/0897* | (2016.01) |
| *G06F 11/14* | (2006.01) |
| *G06F 3/06* | (2006.01) |

(52) U.S. Cl.
CPC .......... *G06F 11/073* (2013.01); *G06F 3/0619* (2013.01); *G06F 3/0658* (2013.01); *G06F 3/0673* (2013.01); *G06F 11/0787* (2013.01); *G06F 11/141* (2013.01); *G06F 12/0897* (2013.01); *G06F 2212/1016* (2013.01); *G06F 2212/1032* (2013.01); *G06F 2212/222* (2013.01); *G06F 2212/7201* (2013.01)

(58) Field of Classification Search
CPC .. G06F 11/20; G06F 11/2028; G06F 11/1446; G06F 11/1458; G06F 11/1402; G06F 11/1469; G06F 11/1068; G06F 11/1666
USPC ........................................ 714/6.13, 6.11, 6.1
See application file for complete search history.

(56) References Cited

U.S. PATENT DOCUMENTS

| | | |
|---|---|---|
| 5,533,190 A | 7/1996 | Binford et al. |
| 7,194,640 B2 | 3/2007 | McCarty et al. |
| 8,181,065 B2 | 5/2012 | Fachan et al. |
| 9,251,062 B2 | 2/2016 | Flynn et al. |
| 9,274,902 B1 * | 3/2016 | Morley ............... G06F 11/2002 |
| 2005/0050383 A1 * | 3/2005 | Horn ................... G06F 11/2087 |
| | | 714/6.22 |

(Continued)

OTHER PUBLICATIONS

Failure-Atomic Persistent Memory Updates via JUSTDO Logging http://www.labs.hpe.com/techreports/2016/HPE-2016-09.pdf.

(Continued)

*Primary Examiner* — Sarai E Butler

(74) *Attorney, Agent, or Firm* — Loza & Loza, LLP; Gabriel Fitch

(57) ABSTRACT

Systems and methods are disclosed for a journal for a storage class memory device. The storage class memory device may execute an access command for a first page in the storage class memory device. The storage class memory device may also determine whether a failure occurred while executing the access command. The storage class memory device may create an entry in a journal for the storage class memory device if a failure occurred while executing the access command. The storage class memory device may refrain from creating the entry if a failure does not occur while executing the access command.

24 Claims, 6 Drawing Sheets

(56) References Cited

U.S. PATENT DOCUMENTS

| | | | |
|---|---|---|---|
| 2008/0082859 A1* | 4/2008 | Kondo | G11B 20/10009 714/6.13 |
| 2008/0129855 A1* | 6/2008 | Vitsnudel | H04N 5/23232 348/302 |
| 2011/0138222 A1* | 6/2011 | Haines | G06F 11/1048 714/6.12 |
| 2014/0006881 A1* | 1/2014 | Loimuneva | G06F 11/0706 714/57 |
| 2015/0271763 A1* | 9/2015 | Balachandran | H04B 17/23 370/338 |

OTHER PUBLICATIONS

Lingfang Zeng et al; "SJM: an SCM-based Journaling Mechanism with Write Reduction for File Systems" <https://www.csc.lsu.edu/~bhou/publish/discs15> 8 pages. Nov. 2015.

Ashish Nagar; "On-Board Failure Logging (OBFL);" Cypress Semiconductor Corp; May 2010 <https://www.cypress.com/file/99066/download> 6 pages.

Joseph Izraelevitz et al; "Failure-Atomic Persistent Memory Updates via JUSTDO Logging;" Hewlett Packard Labs; Feb. 1, 2016 <https://www.labs.hpe.com/techreports/2016/HPE-2016-09.pdf> 17 pages.

Shivendra Singh; "nvSRAM as Write Journal in RAID Storage Systems;" Cypress Semiconductor Corp; Jul. 2015 (https://www.cypress.com/file/114511/download> 15 pages.

* cited by examiner

300 →

| Command Identifier | Recovered | Remap Count | Data |
|---|---|---|---|
| WRITE_COMMAND_1 | | 1 | 0x113425AEA5A9BEA7 |
| READ_COMMAND_45 | YES | 2 | 0x6EF3C1153FF0CCD7 |
| WRITE_COMMAND_47 | | 3 | 0x15ECE2B70170C6B4 |
| WRITE_COMMAND_102 | | 2 | 0x64D0CB7E4818E0A6 |
| READ_COMMAND_93 | NO | | 0x0000000000000000 |
| WRITE_COMMAND_234 | | 2 | 0x0046350BB512810C |
| READ_COMMAND_304 | YES | 2 | 0x78074D211107094B |
| READ_COMMAND_466 | YES | 4 | 0x01FCABEF5B2B1E97 |
| READ_COMMAND_687 | YES | | 0x1C02772B30AF3AB4 |

| Logical Address | Physical Address |
|---|---|
| 0x8A36 | 0x2600 |
| 0x8833 | 0x40FF |
| 0x6D66 | 0x48D5 |
| 0x54DF | 0x42EA |
| 0x99EE | 0x6F62 |
| 0x116D | 0xF151 |
| 0xAFA7 | 0x37CF |
| 0xEC29 | 0x9896 |
| 0x62E2 | 0x2922 |

*FIG. 4*

CONDITIONAL JOURNAL FOR STORAGE CLASS MEMORY DEVICES

BACKGROUND

Computing devices may use various memories, such as random access memory (RAM), hard disks, etc., to perform various operations. For example, computing devices may use various memories to store instructions to be executed. In another example, computing devices may use the various memories (e.g., RAM, hard disks) to store data used when executing instructions (e.g., values, calculations, numbers, alphanumeric values, etc.).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 3 is a diagram illustrating a table that represents a journal, according to one or more embodiments of the present disclosure.

FIG. 4 is diagram illustrating a mapping table, according to one or more embodiments of the present disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to accessing storage class memory devices.

Overview

Computing devices may use various memories, such as RAM, a hard disk, etc., to perform various operations. Storage class memory or storage class memory devices may be one type of memory that is used in computing devices. Storage class memory may provide access latencies similar to primary memory (such as random-access memory (RAM)). Storage class memory may also have capacities (e.g., storage size) similar to secondary memory (such as hard disk drives).

Certain embodiments, implementations, and/or examples disclosed herein provide the ability to create and/or update a journal for access commands (e.g., commands to read and/or write data) executed in a storage class memory device. The journal may be stored in the storage class memory device (e.g., may be stored in a RAM or in a storage class memory array, of the storage class memory device). Entries in the journal may be created and/or updated when a failure occurs while executing an access command. If a failure does not occur while executing an access command, the storage class memory device may refrain from creating an entry. The entries in the journal are updated when attempts are made to recover from the failures. The entries may also include data that may be used to help recover from the failures. Storing the journal in the storage class memory device may allow the journal to remain in non-volatile memory and may allow the storage class memory device to provide data to a sender of an access command more quickly and/or efficiently when attempting to recover from failures. Refraining from creating an entry in the journal may allow the storage class memory device to operate more quickly/efficiently, to use less data bandwidth, and to reduce the processing load on the storage class memory device.

Computing Device with Storage Class Memory

Figure 1:
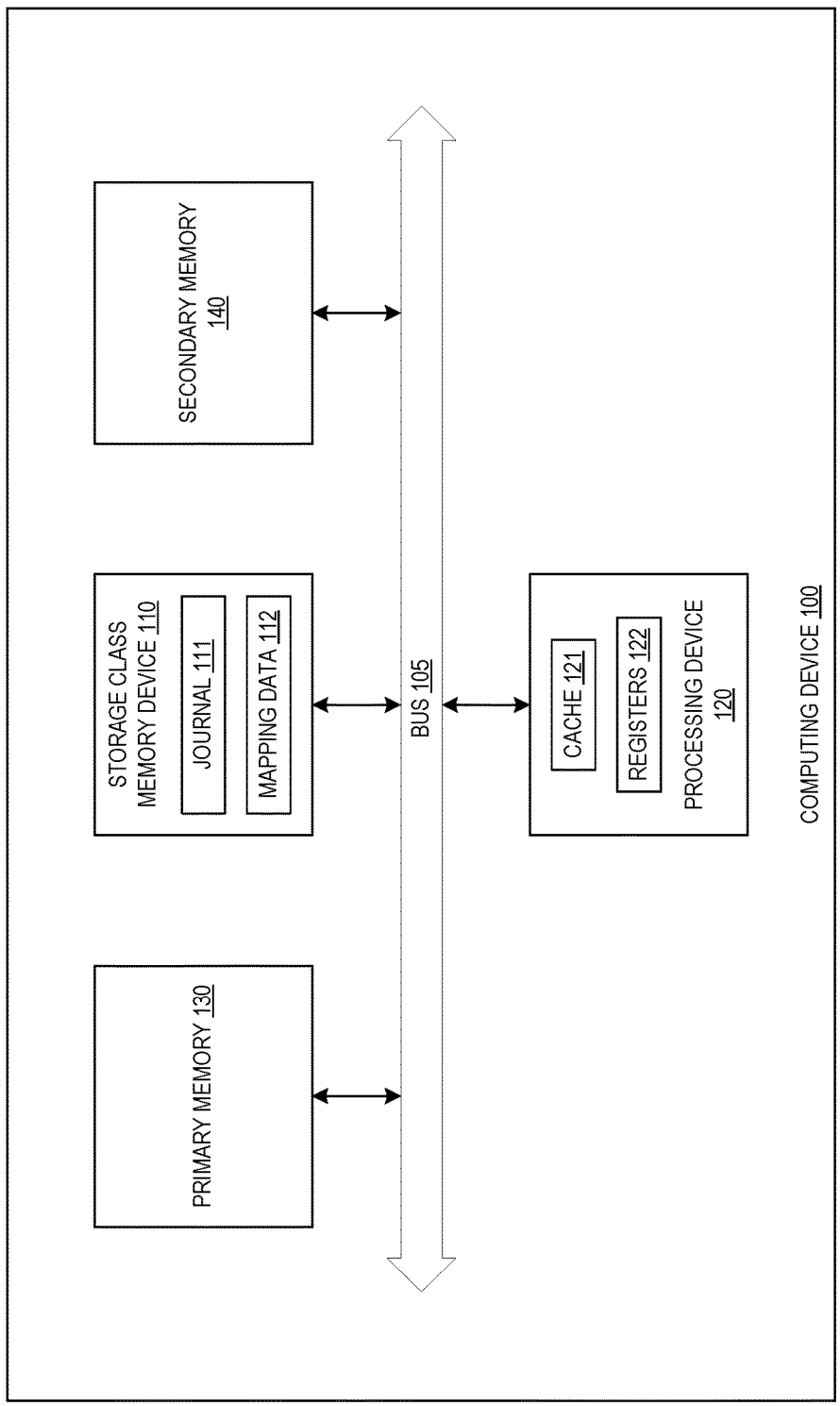
FIG. 1 is a diagram illustrating a computing device, according to one or more embodiments of the present disclosure.

FIG. 1 is a diagram illustrating a computing device 100, according to one or more embodiments of the present disclosure. Examples of computing devices may include, but are not limited to, a mobile phone, a smart phone, a netbook computer, a rackmount server, a set-top box (STB), a router computer, a server computer, a personal computer (PC), a mainframe computer, a laptop computer, a tablet computer, a desktop computer, a video game console, etc. In some embodiments, the computing device 100 may be connected (e.g., networked) to other machines in a LAN, an intranet, an extranet, the Internet, etc., via a network-access interface (e.g., via a network card, via a WiFi card/interface, etc.).

The computing device 100 includes a processing device 120 (e.g., a processor, a central processing unit (CPU), etc.), a primary memory 130 (e.g., random access memory (RAM)), a secondary memory 140, and a storage class memory device 110, which communicate with each other via a bus 105. The bus 105 may be a communications system that transfers data between the processing device 120, the primary memory 130, the secondary memory 140, and/or the storage class memory device 110. Although bus 105 is illustrated in FIG. 1 as a single bus, one having ordinary skill in the art understands that in other embodiments, the bus 105 may include multiple interconnected busses. In some embodiments, the computing device may not include a primary memory 130.

Processing device 120 may be one or more general-purpose processing devices such as a microprocessor, central processing unit, or the like. More particularly, the processing device 120 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 120 may also be one or more special-purpose processing devices such as an application specific integrated circuit (ASIC), a field programmable gate array (FPGA), a digital signal processor (DSP), network processor, or the like.

In one embodiment, the primary memory 130 may be a memory that is directly accessible by the processing device 120. The primary memory 130 may store data that may be frequently used by the processing device 120. Because accessing the primary memory 130 may be faster than accessing the secondary memory 140, storing frequently used data on the primary memory 130 may allow the processing device 120 to execute instructions (and/or perform operations) more quickly. In some embodiments, the primary memory 130 may be accessed randomly. For example, any byte/page of the primary memory 130 may be accessed without accessing preceding bytes/pages. In other embodiments, the primary memory 130 may be volatile. For example, information stored in the primary memory 130 may be lost and/or corrupted if the power supplied to the primary memory 130 is interrupted and/or removed. Examples of primary memory 130 include, but are not limited to, RAM, dynamic RAM (DRAM), synchronous DRAM (SDRAM), a dual in-line memory module (DIMM), a single in-line memory module (SIMM), etc.

In one embodiment, the secondary memory 140 may be a memory that is not directly accessible by the processing device 120. The secondary memory 140 may also store data that may be used by the processing device 120. The data stored in the secondary memory 140 may be used less frequently (by the processing device 120) than the data stored in the primary memory 130 (because it may take longer to access the secondary memory 140 than the primary memory 130). The data stored in primary memory 130 may also be transferred to secondary memory 140 (e.g., from primary memory 130) to prevent the loss of the data or due to lack of free space in the primary memory 130. In some embodiments, the secondary memory 140 may be a non-volatile memory. For example, information stored in the secondary memory 140 may be retained and/or preserved if the power supplied to the secondary memory 140 is interrupted and/or removed (e.g., the secondary memory 140 may generally not lose data when power is interrupted and/or removed). In other embodiments, the secondary memory 140 may include memory components such as optical media, magnetic media, hard disk media, and/or solid-state media.

As discussed above, the processing device 120 may access data (e.g., read and/or write data) when executing instructions and/or performing operations. For example, the processing device 120 may directly access the data and/or may indirectly access the data using various other devices, circuits, components, etc., such as a memory management unit (MMU), a memory controller, a disk controller, etc. The data may be stored/located in various memories within the computing device 100. For example, the processing device 120 may access data stored in a cache 121 (of the processing device 120) such as a level 1 (L1) cache or a level 2 (L2) cache. The processing device 120 may also access data stored in one or more registers 122 (of the processing device 120). As discussed above, the processing device 120 may further access data stored in the primary memory 130 and/or the secondary memory 140. Different memories may have different access latencies. For example, the latency to read/write data from/to the cache 121 and/or the registers 122 may be 1-5 nanoseconds (ns). In another example, the latency to read/write data from/to primary memory 130 may be 60 ns. In a further example, the latency to read/write data from/to the secondary memory 140 may be microseconds or milliseconds. Latency may refer to the amount of time it takes to read data from a memory and/or write data to a memory. For example read latency may be the amount of time to read data from a memory and write latency may be the amount of time to write data to a memory.

Memory with lower access latency may have smaller capacities and may be more expensive. For example, although the cache 121 has the smallest access latency, the cache 121 may be more expensive to manufacture and thus the capacity of the cache 121 (e.g., generally megabytes) may be smaller when compared to the capacity of the primary memory 130 (e.g., gigabytes) and the secondary memory 140 (e.g., hundreds of gigabytes, terabytes, etc.). In another example, primary memory 130 may have a lower access latency than secondary memory and thus the capacity of the primary memory 130 may be smaller when compared to the capacity of secondary memory 140.

In one embodiment, the storage class memory device 110 may allow the processing device 120 to access data with a latency that may be similar accessing data in primary memory 130. The storage class memory device 110 may have a larger capacity (e.g., larger storage size) than the primary memory 130. For example, the capacity of the storage class memory device 110 may be similar to the size of the secondary memory 140 (e.g., may be hundreds/thousands of gigabytes).

In one embodiment, the storage class memory device 110 may have one or more of the following properties: 1) the storage class memory device 110 may be randomly accessible; 2) the access latency of the storage class memory device 110 may be similar to the access latency of the primary memory 130; 3) the storage class memory device 110 may be a non-volatile memory; 4) the capacity of the storage class memory device 110 may be similar to the size of the secondary memory 140. The type of media used in the storage class memory device may include, but is not limited to phase change memory (PCM), spin-torque-transfer (STT) RAM, resistive RAM, mixed ionic-electronic conduction (MIEC) memory, ferrous oxide, 3-dimensional (3D) crosspoint memory, and memristors, etc.

In one embodiment, the storage class memory device 110 may operate as a cache between the primary memory 130 and the secondary memory 120. In another embodiment, the storage class memory device may replace the primary memory 130 and/or the secondary memory 140. For example, the computing device 100 may include the storage class memory device 110 and the secondary memory 140, but may not include the primary memory 130. In another example, the computing device 100 may include the primary memory 130 and the storage class memory device 110, but may not include the secondary memory 140.

In one embodiment, the storage class memory device 110 may receive an access command for a first page in the storage class memory device 110, from the processing device 120. For example, the storage class memory device 110 may receive a read command (e.g., an access command to read data from the first page in the storage class memory device 110) and/or a write command (e.g., an access command to write data to the first page in the storage class memory device 110). The storage class memory device 110 may execute the access command. For example, the storage class memory device 110 may attempt to read data from the first page in the storage class memory device 110. The storage class memory device 110 may determine whether a failure occurred while executing the access command. For example, the storage class memory device 110 may determine whether there was a failure reading data from the first page. In another example, the storage class memory device 110 may determine whether there was a failure writing data to the first page (e.g., whether data was successfully written to the first page).

In one embodiment, the storage class memory device 110 may create an entry in a journal (for the storage class memory device) when a failure occurs while executing the access command. In one embodiment, the entry may include one or more of the following: 1) data indicating that a failure occurred while executing the access command; 2) data that may identify the access command; 3) data that may be used to recover from the failure (e.g., recovered data, as discussed in more detail below); and 4) data that may indicate operations or actions performed by the storage class memory device 110 in response to the failure.

Although the present disclosure may refer to journals and/or entries, one having ordinary skill in the art understands that various types of data structures and/or mechanisms may be used. For example, tables, logs, records, reports, etc., may be used instead of a journal. In one embodiment, the journal 111 may be stored in the storage class memory device 110. In another embodiment, the journal 111 may be stored in a separate memory that is non-volatile.

In one embodiment, the storage class memory device 110 may refrain from creating an entry in the journal 111 when a failure does not occur while executing the access command. For example, the storage class memory device 110 may not create an entry in the journal 111 when a read command for the first page (e.g., an access command) is successfully executed (e.g., when the storage class memory device 110 is able to read data from the first page). In another example, the storage class memory device 110 may not create an entry in the journal when a write command for the first page (e.g., an access command) is successfully executed (e.g., when the storage class memory device 110 is able to write data to the first page). Refraining from creating an entry when a failure does not occur may decrease the time to execute access commands that complete successfully, may decrease the processing load of the controller of the storage class memory device, and may decrease the data bandwidth usage of the storage class memory device.

Read Commands

In one embodiment, the access command for the first page may be a read command. A read command may be an access command (or a request) to read data from the first page in the storage class memory device 110. The read command may indicate a logical address for the first page and the storage class memory device 110 may translate the logical address for the first page into a physical address for the first page (e.g., using a mapping table), as discussed in more detail below. A failure that occurs while executing a read command (e.g., an access command) may be referred to as a read failure. For example, a read failure may occur when the storage class memory device 110 is unable to read data from the first page in the storage class memory device 110 (e.g., when the data in the first page is corrupted or when the cells of the first page are not operating properly). If a read failure occurs while executing the read command, the storage class memory device 110 may attempt the recover the data based on recovery data. For example, the storage class memory device 110 may attempt to reconstruct, regenerate, rebuild, etc., the data based on parity data, erasure codes, etc.

If the data in the first page is not recoverable (e.g., cannot be recovered using the recovery data), the storage class memory device 110 may transmit an error message to the processing device 120 (e.g., to a sender of the read command) that the indicating that the data was not recoverable.

In one embodiment, the storage class memory device 110 may also erase (e.g., wipe) the data (e.g., the corrupted data that could not be recovered) in the first page. For example, the storage class memory device 110 may fill the first page with the value "0," the value "1," or some other value, for each bit in the first page if the first page is still usable (e.g., the first page is still valid). A valid page may be a page that is still usable (e.g., for reading and/or writing data) even though a failure occurred while executing an access command for the page. Erasing the data in the first page may also be referred to as resetting or zeroing the first page. If the first page is not usable (e.g., is not valid), the storage class memory device 110 may create an entry in the journal, write default data in to the entry (e.g., all "0" values or all "1" values), may ramp the logical address to the physical address of another page, and may write the default data to the other page.

If the data in the first page is recoverable (e.g., the data in the first page can be reconstructed), the storage class memory device 110 may transmit the data to the sender of the read command. The storage class memory device 110 may also store the recovered data in the journal. For example, the storage class memory device 110 may store the data in the entry (in the journal) that is associated with the read command (e.g., the entry created for the failure that occurred while executing the read command). Storing the recovered data in the journal may allow the storage class memory device to provide the recovered data to other components/devices (e.g., the processing device 120) more quickly/efficiently and may allow the storage class memory device to prevent the recovered data from being lost while the storage class memory device 110 attempts to recover from the failure. In other embodiments, the data recovered from the first page may be stored in another location/memory in the storage class memory device 110. For example, the data recovered from the first page may be temporarily stored in a RAM (e.g., a static RAM (SRAM)) of the storage class memory device 110 while the data storage device 110 attempts to recover from a the failure that occurred while executing the read command.

The storage class memory device 110 may also remap the logical address indicated in the read command to one or more physical addresses for one or more other pages. For example, the storage class memory device 110 may make multiple attempts to write the data (which was recovered from the first page) another page until the recovered data is successfully written to another page or until a threshold number of pages have been tried, as discussed in more detail below. If the recovered data is successfully written to another page, the storage class memory device may remap the logical address indicated in the read command to the physical address of the other page. The storage class memory device 110 may update the entry in the journal each time the storage class memory device 110 remaps the logical address to another physical address for another page, as discussed in more detail below. In one embodiment, remapping may refer to an associating (e.g., map) a logical address (which was previously associated with the physical address of one page) with a physical address of another page. The storage class memory device 110 may attempt to write data to the other page when remapping the logical address to the physical address of the other page.

If the storage class memory device 110 is able to remap the logical address of the first page to the physical address of another page, the storage class memory device 110 may update the mapping table 112 to indicate that the logical address for first page was remapped to the physical address for the second page. For example, the storage class memory device 110 may update the mapping table 112 to indicate an association between the logical address (indicated in the read command) and the physical address of the second page. If the storage class memory device 110 is not able to write the data to another page after a threshold number of pages have been tried, the storage class memory device 110 may transmit an error message indicating that the data that was recovered from the first page could not be written to another page.

In one embodiment, the data stored in the entries of the journal 111 may be used for subsequent access commands when subsequent commands for the same logical address are received while the data storage device is attempt to recover from a failure. For example, if an error occurs while executing a read command for a logical address of a page, the recovered data may be stored in the journal. If a subsequent write command is received for the same logical address, the data that was indicated in the write command may be written to the journal, because the storage class memory device 110 may still be attempting to recover from the failure of the read command. In another example, if an error occurs while executing a write command for a logical address of a page, the data that was indicated in the write command may be stored in the journal. If a subsequent read command is received for the same logical address, the storage class memory device may use the data stored in the journal because the storage class memory device 110 may still be attempting to recover from the failure of the write command.

Executing Write Commands

In one embodiment, the access command may be a write command. A write command may be an access command (or a request) to write data to a first page in the storage class memory device 110. A failure that occurs while executing a write command (e.g., an access command) may be referred to as a write failure. For example, a write failure may occur when the storage class memory device 110 is unable to write data to the first page (e.g., when the cells of the first page are not operating properly).

If there is a failure executing the write command (e.g., executing an access command to write data to a first page), the storage class memory device 110 may store the data (that was supposed to be written to the first page) in the journal. For example, the storage class memory device 110 may store the data in the entry (in the journal) that is associated the write command (e.g., the entry created for the failure that occurred while executing the write command). Storing the recovered data in the journal may allow the storage class memory device to provide the recovered data to a sender of the write command more quickly/efficiently and may allow the storage class memory device to prevent the data from being lost while the storage class memory device attempts to recover from the failure.

The storage class memory device 110 may also remap the logical address indicated in the write command to a physical address for another page, as discussed above. The storage class memory device 110 may also update the entry in the journal each time the storage class memory device 110 remaps the logical address to another physical address for another page.

If the storage class memory device 110 is able to remap the logical address of the first page to the physical address of another page, the storage class memory device 110 may update the mapping table 112 to indicate that the logical address for first page was remapped to the physical address for the second page. For example, the storage class memory device 110 may update the mapping table 112 to indicate an association between the logical address (indicated in the write command) with the physical address of the second page. If the storage class memory device 110 is not able to write the data to another page after a threshold number of pages have been tried (e.g., is unable to remap the logical address to another page within a threshold number of tries), the storage class memory device 110 may transmit an error message indicating that the data that was recovered from the first page could not be written to another page.

In one embodiment, the storage class memory device may include a controller (e.g., a FPGA, an ASIC, a processing device, a processor, etc.), as discussed in more detail below. The controller may perform the methods, functions, operations, and/or actions described herein. For example, the controller may create/update journal entries. In another example, the controller may execute access commands (e.g., read commands and/or write commands), attempt to recover data based on recovery data, remap logical addresses to physical addresses, etc., as discussed above.

Storage Class Memory

Figure 2A:
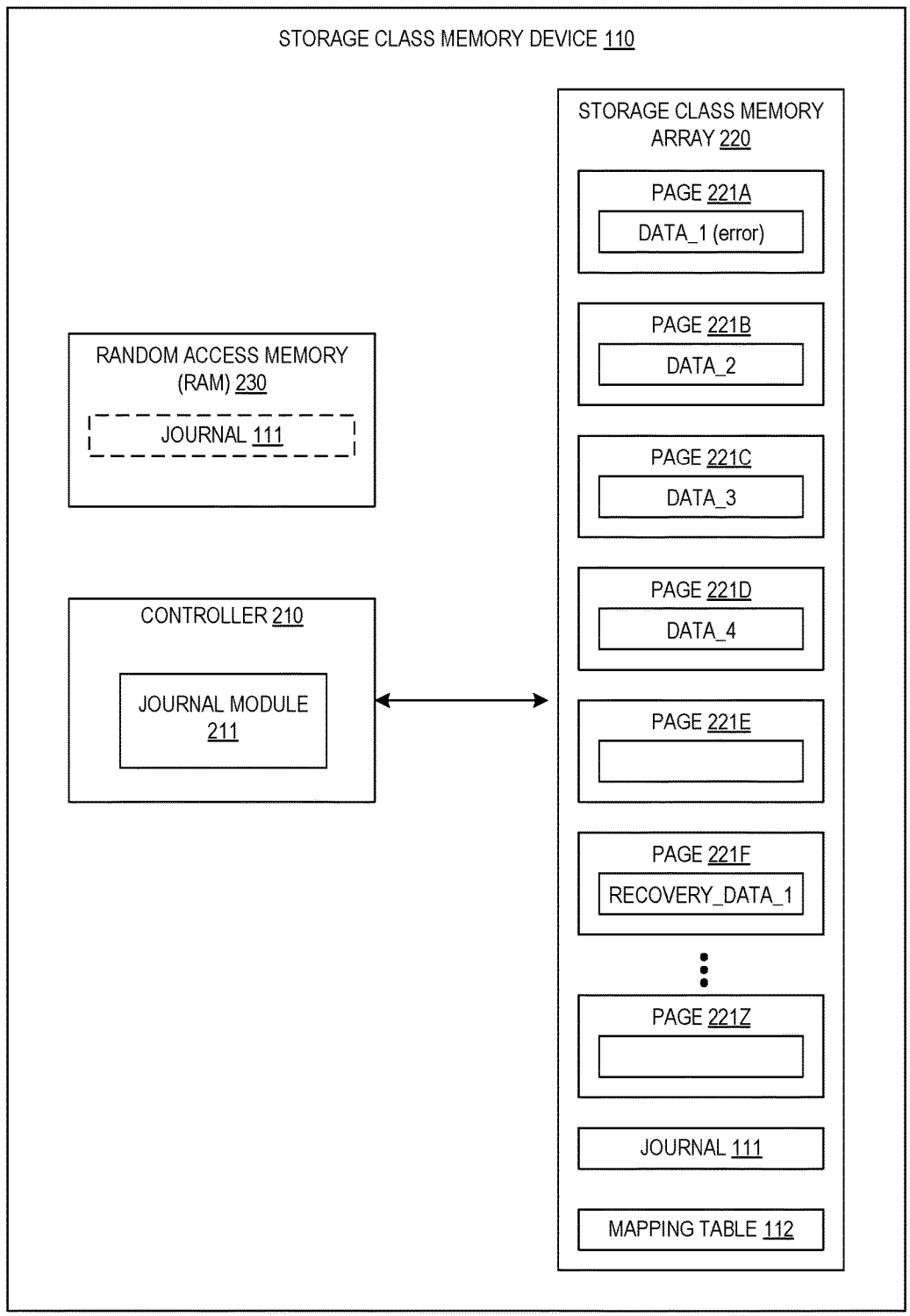
FIG. 2A is a diagram illustrating a storage class memory device, according to one or more embodiments of the present disclosure.

FIG. 2A is a diagram illustrating a storage class memory device, according to one or more embodiments of the present disclosure. The storage class memory device 110 includes a controller 210 and a storage class memory array 220. The controller 210 includes a journal module 211. The journal module 211 may provide means for implementing certain respective functionalities as described herein, wherein such means may comprise control circuitry (e.g., special purpose control circuitry) including one or more processors (e.g., special purpose processor(s)), memory devices, transmission paths, and other hardware and/or software components or combinations thereof, configured to implement the functionalities of the respective modules described herein. The storage class memory device 110 also includes RAM 230 (e.g., an SRAM). Although RAM is illustrated in FIG. 2A, one having ordinary skill in the art understands that other types of memory may be used in other embodiments.

The storage class memory device 110 also includes journal 111 and mapping table 112. In one embodiment, the journal 111 may include entries (e.g., data) associated with failures that occur while executing access commands (e.g., read commands or write commands), as discussed in more detail below. In some embodiments, the journal 111 may be stored/located in the storage class memory array 220. In other embodiments, the journal 111 may be stored in RAM 230. When the journal 111 is stored in the RAM 230, the storage class memory device 110 may implement features and/or mechanisms that may prevent the loss of the journal 111 (e.g., loss that may occur due an interruption in power to the RAM 230). For example, the storage class memory device 110 may periodically backup the journal 111 to the storage class memory array 220. In another example, the storage class memory device 110 may include a backup power source (e.g., a capacitor, a battery, etc.) that may be used to prevent the journal 111 from being lost when power to the RAM 230 is interrupted. Although one journal 111 is illustrated in FIG. 2A, multiple journals may be used in other embodiments. For example, a first journal may be used for read commands while a second journal may be used for write commands. In one embodiment, the mapping table 112 may include metadata indicating mappings between logical addresses and physical addresses. The mapping table 112 may be stored in the storage class memory array 220.

The controller 210 may be a device that may be capable of executing a set of instructions (sequential or otherwise) that specify actions to be taken by the controller 210. For example, the controller 210 may execute instructions that may cause the controller 210 to perform any one or more of the methodologies (e.g., functions, operations, methods, algorithms, etc.) discussed herein. In one embodiment, the journal module 211 may be processing logic, such as software, hardware, firmware, or a combination of both that may perform the functions, operations, actions, algorithms, method, etc., described herein. The storage class memory array 220 may be partitioned and/or divided (either logically or physically) into planes, blocks, pages, and/or sectors. For example, as illustrated in FIG. 2A, the storage class memory array 220 is divided into pages 221A through 221Z. Each of the page may include one or more cells (e.g., memory cells). In one embodiment, a page (e.g., page 221A) may be the smallest grouping of memory cells in the storage class memory array 220 that may be programmed in a single operation or as a unit. As illustrated in FIG. 2A, some of the pages include data (e.g., page 221B includes DATA_2) and some of the pages do not include data (e.g., page 221E is empty or does not include data).

In one embodiment, the storage class memory device 110 may be configured to implement data redundancy and/or data protection functionalities. For example, the storage class memory device 110 may include a data redundancy management module (not shown in FIG. 2A) configured to implement data redundancy and/or data protection functionalities. The data redundancy module may be part of the controller 210 or may be separate from the controller 210. The data redundancy management module may implement redundant array of independent disks (RAID) technology, wherein storage class memory array 220 (e.g., the pages 221A through 221Z) may be combined into logical units for the purposes of data redundancy and performance improvement. For RAID purposes, a first set of pages may store user data and a second set of pages may store parity information for the user data. The parity information may also be parity data, parity bits, etc. The data redundancy management module may also divide and replicate user data among the 221A through 221Z. Data may be distributed across the storage class memory array 220 according to any desirable or practical RAID level, depending on the level of redundancy and/or performance desired. For example, storage class memory device 110 may be configured to implement RAID 0, RAID 1, RAID 5, RAID 6, RAID 10, other RAID technology, or other erasure coding technology, depending on data reliability, availability, performance and/or capacity considerations or requirements. In other embodiments, the data redundancy module may use other types of parity data and/or other codes/coding schemes to implement data redundancy and/or data protection functionalities.

FIG. 2A illustrates actions/operations that may be performed by the controller 210 when a read command is received. As discussed above, the controller 210 may receive a read command from a device/component. For example, the controller 210 may receive the read command from a processing device, as discussed above. The device/component that sends (e.g., transmits) the read command to the controller 210 may be referred to as a sender of the read command or access command. The read command may indicate a logical address for the page 221A. In one embodiment, the controller 210 may use the logical address as a physical address and attempt to read data from a page that has a physical address which is the same as the logical address. In another embodiment, the controller 210 may use the mapping table 112 to determine the physical address for the page 221 based on the logical address if there is a failure reading data from the page that has a physical address which is the same as the logical address. As illustrated in FIG. 2A, there is a failure when reading DATA_1 stored in the page 221A. For example, some of the cells in the page 221 may not be operating properly. The controller 210 may not be able to read DATA_1 due to malfunctioning cells.

The controller 210 may attempt to recover (e.g., reconstruct, rebuild, regenerate, etc.) DATA_1 based on RECOVERY_DATA_1 stored in page 221F. For example, the RECOVERY_DATA_1 may be data generated using an erasure coding scheme and the DATA_1. RECOVERY_DATA_1 may be used to reconstruct DATA_1 (e.g., using exclusive OR (XOR) operations). RECOVERY_DATA_1 may be an example of recovery data. Although a FIG. 2A illustrates a single RECOVERY_DATA_1, one having ordinary skill in the art understands that in other embodiments, multiple pieces, portions, etc., of recovery data (for DATA_1) may distributed among the pages of the storage class memory array 220. In one embodiment, recovery data may be data, codes, and/or values that may be used to recover (e.g., reconstruct, regenerate, rebuild, etc.) data stored in a page. Examples of recovery data may include, but are not limited to, parity data/bits, data generated using erasure codes/schemes, etc.

In one embodiment, the controller 210 may transmit an error message to the device/component that sent the read command (e.g., to a sender of the read command or access command) if the controller 210 is unable to recover DATA_1. For example, the controller 210 may transmit a message to the processing device indicating that the read command failed and that the data stored in page 221A could not be recovered. In another embodiment, the controller 210 may remap the logical address (indicated in the read command) to the physical address of another page, if the controller 210 is able to recover DATA_1, as discussed in more detail below. For example, the controller 210 may try to write DATA_1 to page 221E or page 221Z. The controller 210 may move DATA_1 to another page because a failure occurred when trying to read (e.g., access) DATA_1 from page 221A. This may indicate that page 221A has failed and/or has become more prone to failures/errors. The controller 210 may attempt to write DATA_1 to another page to prevent DATA_1 from further corruption or loss. For example, if DATA_1 is left in page 221A, the bit error rate (BER) of page 221A may increase which may prevent the recovery of DATA_1, even with the RECOVERY_DATA_1. Writing DATA_1 to another page (that may be less prone to failures/errors) may help protect DATA_1 from further corruption or loss.

The controller 210 may also create an entry in the journal 111 if there is a failure while reading DATA_1 from page 221A. The entry in the journal 111 may be associated with the read command (e.g., may identify the read command) and may indicate that a failure occurred while reading DATA_1 from page 221A. In one embodiment, the controller 210 may also include DATA_1 (which was recovered based on RECOVERY_DATA_1) in the entry. In another embodiment, the controller 210 may temporarily store DATA_1 (which was recovered based on RECOVERY_DATA_1) in RAM 230 while the controller 210 attempts to recover from the failure that occurred while executing the read command.

Figure 2B:
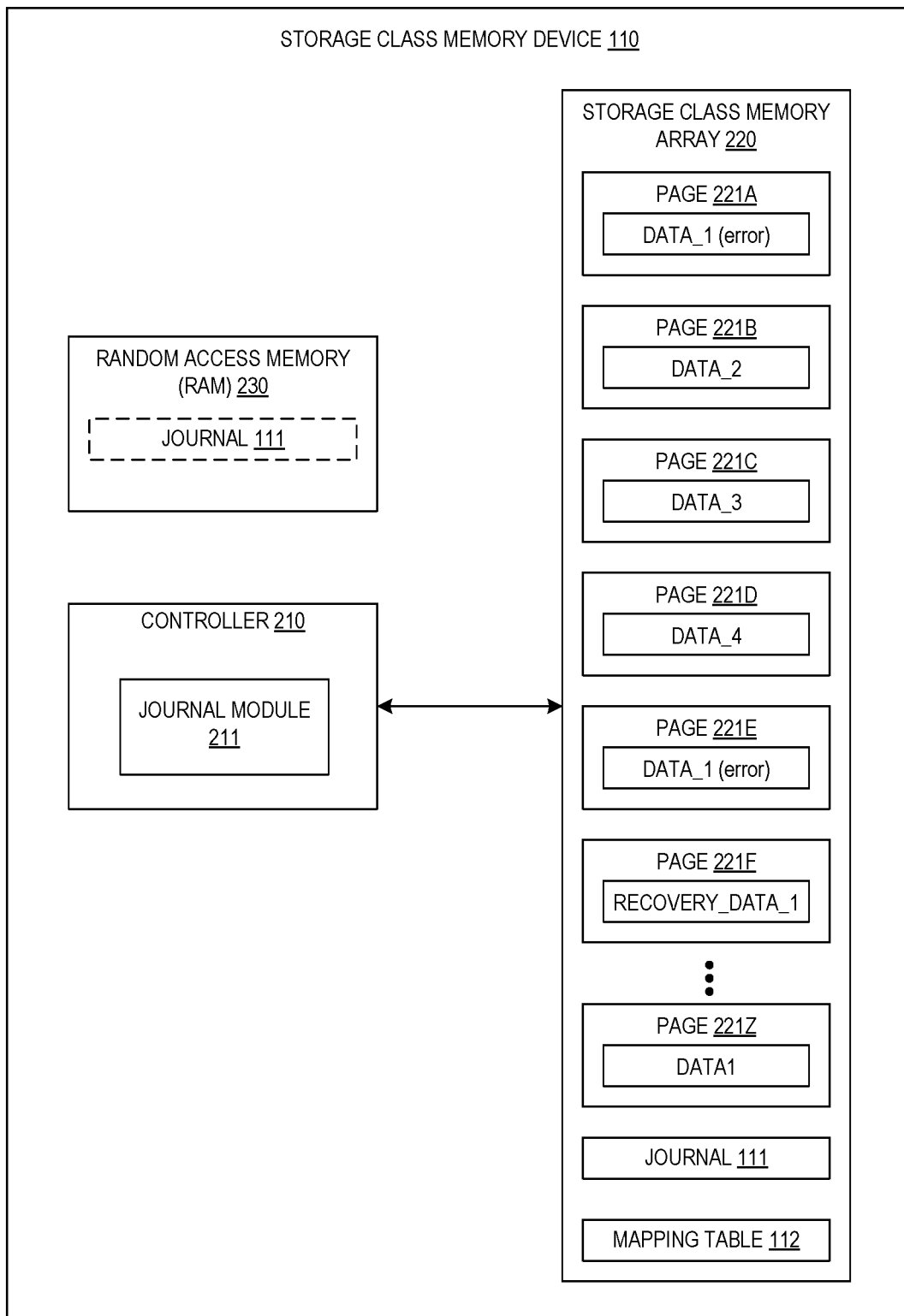
FIG. 2B is a diagram illustrating a storage class memory device, according to one or more embodiments of the present disclosure.

FIG. 2B is a diagram illustrating a storage class memory device 110, according to one or more embodiments of the present disclosure. As discussed above, the storage class memory device 110 includes a controller 210, a storage class memory array 220, a journal 111, and mapping table 112. The controller 210 includes a journal module 211. The storage class memory device 110 also includes RAM 230, as discussed above. The journal 111 may include entries (e.g., data) associated with failures that occur while executing access commands (e.g., read commands or write commands). The storage class memory array 220 is divided into pages 221A through 221Z. Also as discussed above, the storage class memory device 110 may be configured to implement data redundancy and/or data protection functionalities.

The storage class memory device 110 also includes journal 111 and mapping table 112. In one embodiment, the journal 111 may include entries associated with failures that occur while executing access commands, as discussed in more detail below. The journal 111 may be stored/located in the storage class memory array 220 and/or in the RAM 230. Although one journal 111 is illustrated in FIG. 2B, multiple journals may be used in other embodiments. For example, a first journal may be used for read commands while a second journal may be used for write commands. In one embodiment, the mapping table 112 may include metadata indicating mappings between logical addresses and physical addresses. The mapping table 112 may be stored in the storage class memory array 220.

In one embodiment, FIG. 2B may illustrate operations that may be performed by the controller 210 after a read command for is received. As discussed above, the controller 210 may receive a read command that indicates a logical address for page 221A from a device/component. As discussed above, the controller may use the logical address as a physical address and/or may determine/identify a physical address for page 221A based on the logical address and/or the mapping table 112. As illustrated in FIG. 2B, the controller 210 may experience a failure when reading DATA_1 from the page 221A. The controller 210 may attempt to recover (e.g., attempt to reconstruct, rebuild, regenerate, etc.) DATA_1 based on RECOVERY_DATA_1 stored in page 221F and/or based on other pieces/portions of recovery data. If the controller 120 is able to recover DATA_1, the controller 210 may transmit DATA_1 to the device/component that transmitted the read command (e.g., to the device/component that transmitted the original access command to read DATA_1 from page 221A).

Also as discussed above, the controller 210 may remap the logical address (indicated in the read command) to the physical address of another page in the storage class memory array 220 if the controller 210 is able to recover DATA_1 based on recovery data (e.g., based on RECOVERY_DATA_1). Remapping the logical address to the physical address of another page that may be less prone to failures/errors may help protect DATA_1 from further corruption or loss. As illustrated in FIG. 2B, the controller 210 may attempt to write DATA_1 to page 221E (e.g., to remap the logical address to the physical address for page 221E). As illustrated in FIG. 2B, a failure may also occur when writing DATA_1 to page 221E. For example, one or more of the cells in page 221E may be inoperable or may not be functioning properly which may cause a failure when writing DATA_1 to page 221E (e.g., which may prevent DATA_1 from being successfully written to page 221E). In one embodiment, the controller 210 may update the entry in the journal 111 (associated with the read command for page 221A) to indicate that the controller 210 remapped the logical address (indicated in the read command) to the physical address for page 221E (e.g., to write the data to page 221E). For example, the controller 120 may increase a counter that tracks the number of remaps for the logical address (e.g., the number of times the logical address has been mapped to or associated with a physical address). As discussed above, the entry in the journal 111 (associated with the read command) may include DATA_1 (or DATA_1 may be stored separate from the journal 111). DATA_1 may also be stored in another memory (e.g., a RAM 230) while the controller attempts to write DATA_1 to one or more other pages.

When the controller 210 is unable to remap the logical address (indicated in the read command) to the physical address page 221E, the controller 210 may remap the logical address to the physical address of page 221X (e.g., to another page). As illustrated in FIG. 2B, the controller 210 may successfully write DATA_1 to page 221Z. The controller 210 may update the mapping table 112 to indicate that the logical address (indicated in the read command) should be associated/mapped to the physical address of page 221Z.

In one embodiment (not illustrated in FIG. 2B), a failure may also occur when writing DATA_1 to page 221Z. The controller 210 may continue to remap the logical address (indicated in the access command) to other pages in the storage class memory array 220) until a threshold number remaps is reached (e.g., a threshold number of pages are tried). For example, the controller 210 may attempt to write DATA_1 to two other pages in addition to the attempts to write DATA_1 to page 221E and page 221Z (for a total of four attempted pages). In one embodiment, the controller 210 may transmit DATA_1 to the device/component that sent the read command if the controller 210 is able to write DATA_1 to a page before the threshold number of pages is reached. In another embodiment, if the controller is not able to write DATA_1 to a page before the threshold number of pages is reached, the controller 210 may transmit DATA_1 to the device/component that sent the read command and may transmit a message (e.g., an error message) indicating that DATA_1 was recovered from page 221A, but could not be written to another page in the storage class memory array 220. One having ordinary skill in the art understands that the number of threshold pages may be different in various embodiments. For example, in some embodiments, the controller 210 may try to write data to a total of three pages, eight pages, ten pages, etc. The threshold number of pages may be determined by the controller 210 based on a setting/configuration parameter or may be received from another device/component (e.g., may be received from a processing device).

In one embodiment, the controller 210 may update the journal 111 (e.g., update the entry associated with the read command) each time the controller 210 remaps the logical address (indicated in the read command) to the physical address of another page. For example, the controller 210 may update the entry for the read command when attempting to write DATA_1 to page 221E and may update the same entry for the read command when attempting to write DATA_1 to the page 221Z.

In one embodiment, the controller 210 may access page 221Z when executing subsequent read commands for the logical address. For example, the controller 210 may receive a second read command that also indicates the same logical address as the first read command. As discussed above, the controller 210 may use the logical address as a physical address and/or may access the mapping table 112 to determine the physical address that is mapped to the logical address. The mapping table 112 may indicate that the physical address for page 221Z is mapped to the logical address (e.g., is associated with the logical address and vice versa). The controller 210 may read the data (e.g., DATA_1)

from the page 221Z based on the mapping table 112 for subsequent read commands for the same logical address.

In another embodiment, FIG. 2B may illustrate operations that may be performed by the controller 210 after a write command for page 221A is received. For example, the controller 210 may receive an access command to write DATA_1 to page 221A (e.g., may receive a write command). The access command may indicate a logical address for page 221A. As discussed above, the controller 210 may use the logical as physical address and/or the may determine that the logical address is mapped to (e.g., associated with) the physical address for page 221A. A failure may occur when writing DATA_1 to page 221A. The controller 210 may remap the logical address (indicated in the write command) to the physical address of another page in the storage class memory array 220 when there is a failure while writing DATA_1 to page 221A. The controller 210 may also create an entry in the journal 111 (associated with the write command) when the controller 210 is unable to write DATA_1 to the page 221A (e.g., when the failure occurs while executing the write command to write DATA_1 to page 221A). As discussed above, the entry in the journal 111 (associated with the write command) may include DATA_1 (or DATA_1 may be stored separate from the journal 111). DATA_1 may also be stored in another memory such as RAM 230 while the controller remaps the logical address to the physical address of another page.

When the controller 210 is unable to write data to page 221E, the controller 210 may remap the logical address to the physical address for page 221Z. For example, the controller 210 may update the mapping table 112 to indicate that the logical address has been remapped to physical address for page 221Z. The controller 210 may also attempt to write the data to page 221Z. As illustrated in FIG. 2B, the controller 210 may successfully write the DATA_1 to page 221Z.

In one embodiment (not illustrated in FIG. 2B), a failure may also occur when writing DATA_1 to page 221Z. The controller 210 may continue to attempt to write DATA_1 to other pages in the storage class memory array 220 until the threshold number of pages are tried, as discussed above. The controller 210 may also transmit an error message indicating that DATA_1 could not be written to a page in the storage class memory array 220. In one embodiment, the controller 210 may update the journal 111 (e.g., update the entry associated with the read command) for each attempt to write DATA_1 to a page, as discussed above.

In one embodiment, the controller 210 may access page 221Z when executing subsequent write commands for the logical address. For example, the controller 210 may receive a second write command that also indicates the same logical address. The controller 210 may access the mapping table 112 to determine the physical address that is mapped to the logical address. The mapping table 112 may indicate that the physical address for page 221Z is mapped to the logical address (e.g., is associated with the logical address and vice versa). The controller 210 may write data for subsequent write commands that indicate the same logical address, to page 221Z based on the mapping table 112.

In one embodiment, the controller 210 may identify, determine, select, etc., other pages (e.g., other pages for attempting to write DATA_1) using various algorithms, methods, functions, operations, and/or processes. For example the controller 210 may use a pseudo-random number generator (PRNG) to generate random page numbers. In another example, the controller 210 may divide the pages into logical groups. When data cannot be written to a first page in a (logical) group of pages, the controller 210 may attempt to write the data to another page in the group of pages. Additional details, examples, implementations, and embodiments for identifying, selecting, determining, etc., other pages may be found in U.S. patent application Ser. No. 15/388,883, filed on Dec. 22, 2016, entitled BAD PAGE MANAGEMENT IN STORAGE DEVICES, which is hereby expressly incorporated by reference in its entirety for all purposes.

FIG. 3 is a diagram illustrating a table 300 that represents a journal, according to one or more embodiments of the present disclosure. As discussed above, the journal may be used by a storage class memory device. In one embodiment, the journal may be stored in a storage class array of a storage class memory device. In another embodiment, the table 300 may be stored in another memory (e.g., a RAM, a SRAM, etc.) of the storage class memory device. The table 300 (which represents the journal) includes the following columns: 1) Command Identifier; 2) Recovered; 3) Remap Count; and 4) Data. Each row of the table 300 may represent an entry for an access command where a failure occurred while executing the access command. For example, as the storage class memory device attempts to recover data and/or remaps pages, the storage class memory device may update the same entry for the associated command.

In one embodiment, the table 300 may include entries only for access commands where a failure occurred while executing the access command. The table 300 may be referred to as a conditional journal because entries in the journal may be created/updated only when a failure occurs while executing an access command. This may increase the efficiency of the storage class memory device when compared to a traditional journal that may create an entry in a journal each time an access command is executed. For example, if an entry is created in a journal each time an access command is executed (regardless of whether there is an failure), this may increase the time to execute an access command because it will take time to create an entry for each command that is executed. This may also increase the processing load on a controller of the storage class memory device and may increase data bandwidth usage of the storage class memory device. A conditional journal (e.g., table 300) may decrease the time to execute access commands that complete successfully (without failures). The conditional journal may also decrease processing load and the data bandwidth usage of the storage class memory device because no entries may not be created for access commands that are executed successfully.

In one embodiment, the Command Identifier column may include an identifier for the access command associated with the entry. For example, Command Identifier column may include an identification number, an alphanumeric value, etc., that may be used to identify an access command. In one embodiment, the Recovered column may include data indicating whether there was an attempt to recover data stored in a page and/or data indicating whether the recovery attempt was successful/failed, as discussed in more detail below. In one embodiment, the Remap Count may include data indicating how many times a logical address was mapped to a physical address of a page, as discussed in more detail below. In one embodiment, the Data column may include the data for the access command. For example, for a read command, the data in the Data column may be data recovered from a page using recovery data, as discussed above. In another example, for a write command, the data in the Data column may be data that was supposed to be written to a page.

As illustrated in FIG. 3, the first entry is for an access command with the Command Identifier WRITE_COMMAND_1, which may indicate that the access command is a write command and may identify the write command. The first entry also indicates that there has been one remap for WRITE_COMMAND_1 and that no data has been recovered (because the access command is a write command and thus there is no page to recover data from). The first entry further includes the data (e.g., 0x113425AEA5A9BEA7) that was supposed to be written to the page specified by WRITE_COMMAND_1. In some embodiments (not illustrated in FIG. 3), the data for WRITE_COMMAND_1 may not be stored in the journal. For example, the data may be stored in another portion of the storage class memory device (e.g., stored in the storage class memory device but not stored in the journal) or in another memory separate from the storage class memory device (e.g., a secondary memory such as RAM).

The second entry is for an access command with the Command Identifier READ_COMMAND_45, which may indicate that the access command is a read command and may identify the read command. The second entry also indicates that data has been recovered from the page specified by READ_COMMAND_45, and that there have been two remaps. The second entry further includes the data (e.g., 6EF3C1153FF0CCD7) that was recovered from the page specified by READ_COMMAND_4. As discussed above, the data included in the second entry may not be stored in the table 300 in other embodiments.

The fifth entry is for an access command with the Command Identifier READ_COMMAND_93 which may indicate that the access command is a read command and may identify the read command. The fifth entry also indicates that the data could not be recovered from the page specified by READ_COMMAND_93. The fifth entry DATA column of the fifth entry includes "0x0000000000000000" (e.g., a default value) because the data could not be recovered. The seventh entry is for an access command with the Command Identifier READ_COMMAND_687 which may indicate that the access command is a read command and may identify the read command. The seventh entry may indicate that data has been recovered from the page specified by READ_COMMAND_687 and that remapping has not been performed yet. In one embodiment (not illustrated in the figures), the logical address indicated in an access command may also be included in the journal. For example, the table 300 may include an extra column that includes the logical addresses indicated in the access commands.

In some embodiments, the entries in the journal may be removed (e.g., deleted, erased, etc.) after the storage class memory device completes an access command and/or transmits an error message indicating that the access command could not be completed. In other embodiments, storage class memory device may allow an entry to be overwritten after the storage class memory device completes an access command and/or transmits an error message indicating that the access command could not be completed. For example, the storage class memory device may allow an entry to be reused/overwritten for a subsequent access command that fails.

FIG. 4 is a diagram illustrating a mapping table 400, according to one or more embodiments of the present disclosure. As discussed above, logical address that was associated with the physical address of a first page may be associated with (e.g., remapped to) to the physical address of a second page when a failure occurs while executing an access command. For example, if a failure occurs while reading data from the first page, the data may be recovered (e.g., using recovery data) and may be written/stored to the second page (as discussed above). The logical address may be associated with (e.g., remapped to) the physical address of the second page. In another example, if there is a failure while writing data to the first page, the data may be written to the second page (as discussed above). The mapping table 400 includes metadata that may indicate the mapping/ association of logical addresses to physical address. In one embodiment, the mapping table 400 may be stored in the storage class memory device (e.g., in a storage class memory array).

As illustrated in FIG. 4, the mapping table 400 includes the following columns: 1) Logical Address; and 2) Physical Address. Each row of the mapping table 400 may indicate a mapping/association between a logical address and a physical address. For example, the first entry may indicate that logical address 0X8A36 is mapped to (e.g., associated with) a page with physical address 0x2600. In another example, the ninth entry may indicate that the logical address 0x62E2 is mapped to (e.g., associated with) a page with physical address 0x2922. The table 400 illustrates one example for mapping logical addresses to physical addresses. One having ordinary skill in the art understands that other mapping methods, techniques, representations, etc., may be used to map logical addresses to physical addresses.

In one embodiment, the storage class memory device may update entries in the mapping table 400. For example, a failure may occur when the storage class memory device attempts to write data to the page indicated by logical address 0x8A36 (in the first entry). The storage class memory device may attempt to write the data to another page and may update the physical address of the entry to the physical address of the other page.

Figure 5:
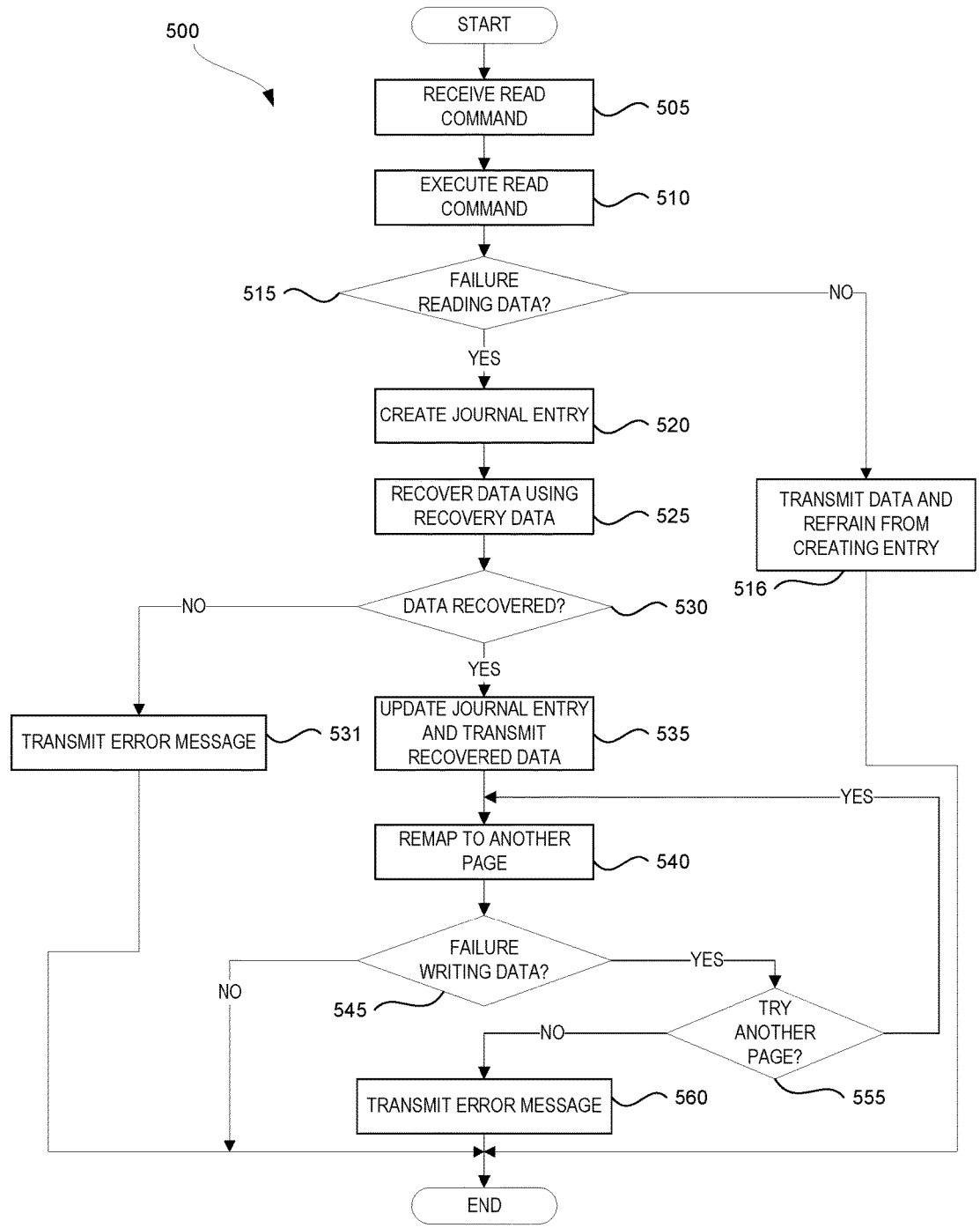
FIG. 5 is a flow diagram illustrating a process for accessing a storage class memory device, according to one or more embodiments of the present disclosure.

FIG. 5 is a flow diagram illustrating a process 500 for accessing a storage class memory device (e.g., executing access commands), according to one or more embodiments of the present disclosure. The process 500 may be performed by a controller, a journal module (e.g., journal module 211 illustrated in FIGS. 2A and 2B), a processing device (e.g., a processor, a central processing unit (CPU)), and/or storage class memory device. The controller, processing device, and/or storage class memory device may be processing logic that includes hardware (e.g., circuitry, dedicated logic, programmable logic, microcode, etc.), software (e.g., instructions run on a processor to perform hardware simulation), firmware, or a combination thereof.

The process 500 begins at block 505 where the process receives a read command. For example, a controller of a storage class memory device may receive the read command from a device, component, circuit, etc., that is external to the storage class memory device. As discussed above, the read command may indicate a logical address for a first page. The process 500 may use the logical address as a physical address and/or may access a mapping table to determine a physical address that is mapped to (e.g., associated with) the logical address, as discussed above. At block 510, the process 500 executes the read access command. For example, the process 500 may attempt to read data from the first page using the physical address.

At block 515, the process 500 may determine whether there was a failure while reading the data, as discussed above. If there is no failure while executing the read command, the process 500 transmits the data to a sender of the read command (e.g., a device/component that transmitted the read command to the storage class memory device) at block 516. The process 500 may also refrain from creating an entry in the journal at block 516. For example, if there is no failure while executing the read access command, the process 500 may not create an entry in the journal.

If there is a failure while executing the read command, the process 500 creates a journal entry (e.g., an entry in a journal) at block 520. For example, the process 500 may create an entry (e.g., a row) in the table illustrated in FIG. 3. At block 525, the process 500 may attempt to recover the data using recovery data, as discussed above. For example, the process 500 may attempt to recover the data in the first page using parity data, erasure codes, etc., as discussed above. The process 500 determines whether the data was successfully recovered at block 530. If the data cannot be recovered using the recovery data, the process 500 transmits an error message to the sender of the read command at block 531, as discussed above.

If the data can be recovered using the recovery data, the process 500 updates the journal entry at block 535 and transmits the recovered data to the sender of the read command. For example, the process 500 may update the journal entry to include the data that was recovered from the first page. At block 540, the process 500 may remap the logical address specified in the read command to the physical address of another page. The process 500 may also attempt to write the data that was recovered, to the other page. As discussed above, the process 500 may selected, identify, determine, etc., the other page using various methods, algorithms, functions, operations, etc. Also as discussed above, the data that was recovered may be written to another page to prevent the data from further loss and/or corruption. The process 500 determines whether a failure occurred while writing the data to the other page at block 545.

If no failure occurred while writing data to the other page, the process 500 ends. If a failure occurred while writing data to the other pave, the process 500 determines whether to try to write the data to another page (e.g., whether to remap the logical address to the physical address of another page) at block 555. For example, the process 500 may determine whether a threshold number of pages have been tried. If another page should be tried, the process 500 proceeds to block 540. If the no additional pages should be tried, the process may transmit an error message to a sender of the read command at block 560.

Figure 6:
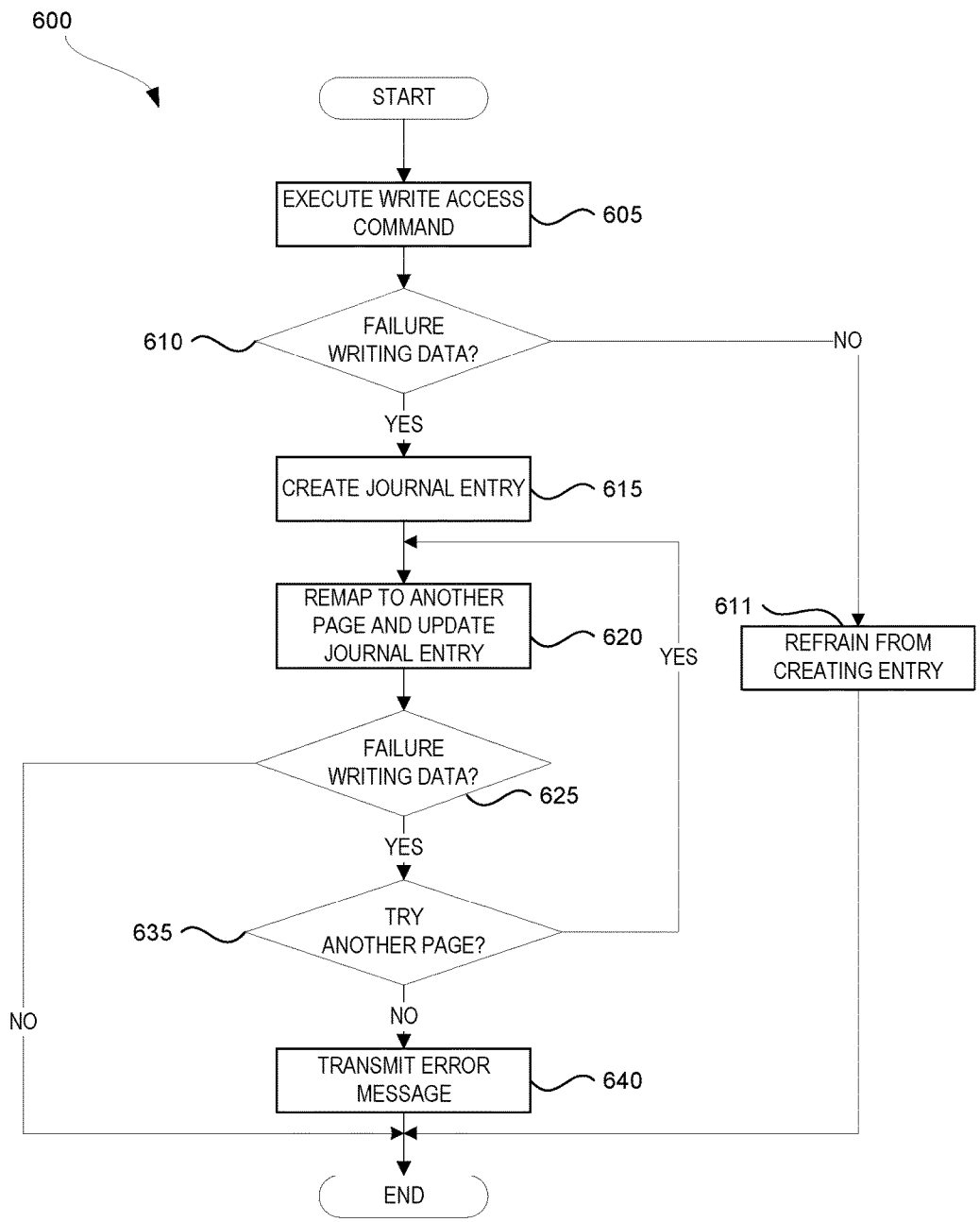
FIG. 6 is a flow diagram illustrating a process for accessing a storage class memory device, according to one or more embodiments of the present disclosure.

FIG. 6 is a flow diagram illustrating a process 600 for accessing a storage class memory device, according to one or more embodiments of the present disclosure. The process 600 may be performed by a controller, a journal module (e.g., journal module 211 illustrated in FIGS. 2A and 2B), a processing device (e.g., a processor, a central processing unit (CPU)), and/or a storage class memory device. The controller, processing device, and/or storage class memory device may be processing logic that includes hardware (e.g., circuitry, dedicated logic, programmable logic, microcode, etc.), software (e.g., instructions run on a processor to perform hardware simulation), firmware, or a combination thereof.

The process 600 begins at block 605 where the process 600 receives a write command from a device/component (e.g., a processing device), as discussed above. The process 600 may attempt to execute the write command. For example, the process 600 may attempt to write data to a first page. At block 610, the process 600 determines whether a failure occurred while writing data to the first page, as discussed above. If no failure occurred while writing data to the first page, the process 600 may refrain from creating an entry in the journal at block 611. For example, if no failure occurred while writing data, the process 600 may not create an entry in the journal. If a failure occurred while writing data to the first page, the process 600 creates an entry in a journal at block 615, as discussed above. For example, the process 600 may create an entry (e.g., a row) in the table illustrated in FIG. 3. At block 620, the process 600 remaps the logical address to the physical address of another page. As discussed above, the process 600 may identify, determine, select, etc., the other pages using various methods, algorithms, functions, operations, etc. The process 600 may also update the journal entry at block 620. The process 600 determines whether a failure occurred while writing the data to the other page at block 625.

If no failure occurred while writing the data (e.g., the data was successfully written to the other page), the process 600 ends. If a failure occurred while writing the data (e.g., the data was not successfully written to the other page), the process 600 determines whether to try to write the data to another page at block 635, as discussed above. If another page should be tried, the process 600 proceeds to block 620 where the process 600 remaps the logical address to another page and updates the journal entry, as discussed above. If the no additional pages should be tried, the process 600 may transmit an error message to the sender of the read command at block 640.

General Comments

Those skilled in the art will appreciate that in some embodiments, other types of computing devices and/or memories may be implemented while remaining within the scope of the present disclosure. In addition, the actual steps taken in the processes discussed herein may differ from those described or shown in the figures. Depending on the embodiment, certain of the steps described above may be removed, others may be added, and/or reordered.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A storage class memory device, comprising:
   a storage class memory array;
   a controller coupled to the storage class memory array, the controller configured to:
      execute an access command associated with a first data for a first page in the storage class memory array;
      determine whether a failure occurred while executing the access command;
      attempt to recover the first data based on a recovery data generated using an erasure coding scheme when the failure comprises a read failure and the access command comprises a read command to read the first data from the first page in the storage class memory array;
      transmit an error message to a sender of the access command when the first data is not recoverable based on the recovery data;
      create an entry in a journal for the storage class memory device when the failure occurred while executing the access command, the entry comprising information indicating that the failure occurred while executing the access command; and
      refrain from creating the entry when the failure did not occur while executing the access command.

2. The storage class memory device of claim 1, wherein the controller is further configured to:
   erase the first page when the first data is not recoverable based on the recovery data.

3. The storage class memory device of claim 1, wherein the controller is configured to execute the access command by:
   determining a physical address for the first page based on a logical address indicated in the access command.

4. The storage class memory device of claim 3, wherein the controller is further configured to:
   store the first data in the journal when the first data is recoverable based on the recovery data; and
   remap a logical address indicated in the access command to one or more physical addresses of one or more other pages.

5. The storage class memory device of claim 4, wherein the controller is further configured to:
   transmit the first data to a sender of the access command.

6. The storage class memory device of claim 1, wherein the failure comprises a write failure and the access command comprises a write command to write the first data to a first page in the storage class memory array.

7. The storage class memory device of claim 6, wherein the controller is further configured to:
   store the first data in the journal; and
   remap a logical address indicated in the access command to one or more physical addresses of one or more other pages.

8. The storage class memory device of claim 7, wherein the controller is further configured to:
   transmit an error message to a sender of the access command when the first data cannot be written to another page after a threshold number of attempts.

9. The storage class memory device of claim 1, wherein the journal is stored in the storage class memory array.

10. The storage class memory device of claim 1, wherein the entries in the journal are associated with access commands which had failures during execution.

11. The storage class memory device of claim 1, wherein the recovery data is stored in the journal.

12. The storage class memory device of claim 1, wherein the recovery data is distributed among a plurality of pages of the storage class memory array.

13. A method, comprising:
   executing an access command associated with a first data for a first page in a storage class memory device;
   determining whether a failure occurred while executing the access command;
   attempting to recover the first data based on a recovery data generated using an erasure coding scheme when the failure comprises a read failure and the access command comprises a read command to read the first data from the first page in the storage class memory device;
   transmitting an error message to a sender of the access command when the first data is not recoverable based on the recovery data;
   creating an entry in a journal for the storage class memory device when the failure occurred while executing the access command, the entry comprising information indicating that the failure occurred while executing the access command; and
   refraining from creating the entry when the failure did not occur while executing the access command.

14. The method of claim 13, further comprising:
   erasing the first page when the first data is not recoverable based on the recovery data.

15. The method of claim 13, wherein executing the access command comprises:
   determining a physical address for the first page based on a logical address indicated in the access command.

16. The method of claim 15, further comprising:
   storing the first data in the journal when the first data is recoverable based on the recovery data; and
   remap a logical address indicated in the access command to one or more physical addresses of one or more other pages.

17. The method of claim 16, further comprising:
   transmitting the first data to a sender of the access command.

18. The method of claim 13, wherein the failure comprises a write failure and the access command comprises a write command to write the first data to a first page in the storage class memory device.

19. The method of claim 18, further comprising:
storing the first data in the journal; and
remap a logical address indicated in the access command to one or more physical addresses of one or more other pages.

20. The method of claim 19, further comprising:
transmitting an error message to a sender of the access command when the first data cannot be written to another page after a threshold number of attempts.

21. A storage class memory device, comprising:
a storage class memory array;
means for determining whether a failure occurred while executing an access command associated with a first data for a first page in the storage class memory array;
means for attempting to recover the first data based on a recovery data generated using an erasure coding scheme when the failure comprises a read failure and the access command comprises a read command to read the first data from the first page in the storage class memory array;
means for transmitting an error message to a sender of the access command when the first data is not recoverable based on the recovery data;
means for creating an entry in a journal for the storage class memory device when the failure occurred while executing the access command, the entry comprising information indicating that the failure occurred while executing the access command; and
means for refraining from creating the entry when the failure did not occur while executing the access command.

22. The storage class memory device of claim 21, further comprising:
means for storing the first data in the journal when the first data is recoverable based on the recovery data; and
means for remapping a logical address indicated in the access command to one or more physical addresses of one or more other pages.

23. The storage class memory device of claim 21, wherein the failure comprises a write failure and the access command comprises a write command to write the first data to a first page in the storage class memory device.

24. The storage class memory device of claim 23, further comprising:
means for storing the first data in the journal; and
means for remapping a logical address indicated in the access command to one or more physical addresses of one or more other pages.

\* \* \* \* \*